US009588557B2

United States Patent
Wilkins et al.

(10) Patent No.: US 9,588,557 B2
(45) Date of Patent: Mar. 7, 2017

(54) REACTIVE FOLLOWING FOR DISTRIBUTED GENERATION AND LOADS OF OTHER REACTIVE CONTROLLER(S)

(71) Applicant: Power Quality Renaissance, LLC, Henderson, NV (US)

(72) Inventors: Thomas Alexander Wilkins, Henderson, NV (US); Charles Grunewald, Ottertail, MN (US); Matthew R. Hadsell, Waite Park, MN (US)

(73) Assignees: Thomas Alexander Wilkins, Henderson, NV (US); Charles Grunewald, Ottertail, MN (US); Matthew R. Hadsell, Waite Park, MN (US)

( * ) Notice: Subject to any disclaimer, the term of this patent is extended or adjusted under 35 U.S.C. 154(b) by 424 days.

(21) Appl. No.: 13/673,185

(22) Filed: Nov. 9, 2012

(65) Prior Publication Data
US 2013/0131878 A1 May 23, 2013

Related U.S. Application Data

(60) Provisional application No. 61/558,703, filed on Nov. 11, 2011.

(51) Int. Cl.
*G06F 1/26* (2006.01)
*H02J 3/16* (2006.01)
*H02J 3/38* (2006.01)

(52) U.S. Cl.
CPC ............... *G06F 1/26* (2013.01); *H02J 3/16* (2013.01); *H02J 3/382* (2013.01); *Y02E 40/34* (2013.01)

(58) Field of Classification Search
None
See application file for complete search history.

(56) References Cited

U.S. PATENT DOCUMENTS

| 5,043,862 A | 8/1991 | Takahashi |
| 7,095,597 B1 * | 8/2006 | Cousineau ..................... 361/20 |

(Continued)

FOREIGN PATENT DOCUMENTS

| KR | 10-2011-0092397 | * 10/2011 | ................ H02J 3/18 |

OTHER PUBLICATIONS

Translation of Korean Patent Application No. 10-2011-0092397 to Kwon et al.*

(Continued)

*Primary Examiner* — Mohammad Ali
*Assistant Examiner* — Bernard G Lindsay

(57) ABSTRACT

Systems and methods for providing generated power to a power grid subject to reactive power requirements. A reactive follower includes a reactive power generator coupled to a distributed power plant via a series impedance such as a step-up transformer. A reactive follower controller controls the reactive power generator on the basis of an estimated reactive power commanded by a reactive power management system and includes multi-variable control logic to determine when to increase reactive power produced by the reactive power generator based on the reactive power commanded by the distributed reactive power management system and point-of-interconnection measurements of power, reactive power, and voltage.

11 Claims, 3 Drawing Sheets

(56) References Cited

U.S. PATENT DOCUMENTS

| | | | | |
|---|---|---|---|---|
| 7,166,928 | B2 | 1/2007 | Larsen | 290/55 |
| 8,073,568 | B2 | 12/2011 | Hsu | |
| 2003/0173938 | A1 | 9/2003 | Trainer et al. | 323/205 |
| 2008/0143304 | A1* | 6/2008 | Bose et al. | 323/205 |
| 2010/0025994 | A1 | 2/2010 | Cardinal et al. | 290/44 |
| 2010/0109447 | A1* | 5/2010 | Achilles et al. | 307/153 |
| 2010/0148508 | A1* | 6/2010 | Garcia | F03D 9/003 290/44 |
| 2010/0308585 | A1* | 12/2010 | Jorgensen | F03D 7/0284 290/44 |
| 2012/0010756 | A1* | 1/2012 | Larsen | F03D 9/003 700/289 |
| 2013/0131878 | A1 | 5/2013 | Wilkins | |
| 2013/0162043 | A1* | 6/2013 | Ellena | H02J 3/38 307/43 |

OTHER PUBLICATIONS

Arrillaga 'A static alternative to the transformer on-load tap-changer', IEEE Transactions on Power Apparatus and Systems, vol. PAS-99, p. 86 (1980).*

Ellis et al., "Reactive Power Performance Requirements for Wind and Solar Plants," *Power and Energy Society General Meeting*, 2012 IEEE, 8 pages (Jul. 22-26, 2012).

Federal Energy Regulatory Commission, "Principles for Efficient and Reliable Reactive Power Supply and Consumption," Federal Energy Regulatory Commission Staff Report, 177 Pages (Feb. 4, 2005).

Relay Monitoring Systems Pty. Ltd. (www.rmspl.com.au), "Voltage Regulation," www.rmspl.com.au/solutions/2v164.pdf, 4 pages (produced prior to Feb. 28, 2010).

Electric Power Distribution Handbook CRC Press 2004.

* cited by examiner

REACTIVE FOLLOWING FOR DISTRIBUTED GENERATION AND LOADS OF OTHER REACTIVE CONTROLLER(S)

The present Application claims priority from U.S. Provisional Patent Application Ser. No. 61/558,703, filed Nov. 11, 2011, which is incorporated herein by reference.

TECHNICAL FIELD

The present invention relates to methods and apparatus for distributed power generation systems, such as those that employ wind turbines, for example, and, more particularly, to the regulation of reactive power in such distributed power generation systems.

BACKGROUND ART

In a system or network carrying AC current, the current, as measured at any particular point in the system, may lead, or lag, the voltage measured at the same point by some phase difference. To the extent to which current and voltage are out of phase, the system may be said to be carrying reactive power at that point, in addition to real (or true) power, P, which is the product of the voltage and in-phase component of the current carried at a specified point in the system. Reactive power is the product of the voltage and quadrature component of the current, and is commonly designated by the letter Q, as it will be herein. Reactive power delivery to the load of a system, within specified limits, is crucial to the maintenance of voltage control, owing to the fact that loads may contain significant non-ohmic components, and thus impose reactive power demands on the system. Reactive power issues are discussed at length in *Principles for Efficient and Reliable Reactive Power Supply and Consumption*, Federal Energy Regulatory Commission Staff Report (2005), which is incorporated herein by reference.

DEFINITIONS

A "reactive controller," as the term is used herein, refers to a controller which controls either a switched reactor or a switched capacitor, either of which may be referred to herein as a "switched reactive element." A "reactive controller" may, additionally, control other power network elements, but it must control a switched reactor or switched capacitor to fall within the definition used herein. Until today, the only kind of reactive controller that anyone has ever thought of is a "master reactive controller" that is the sole reactive controller for an entire power system. There has been no suggestion in the art of a reactive controller on the reactive power generator side of a series impedance between a reactive power generator and a distributed generation plant, because it has been assumed that reactive control must encompass the entire system.

The term "master reactive controller," as used herein and in any appended claims, refers to a reactive controller that controls the reactive power at a centralized location within a power system. Such reactive controllers, in the context of power generation by wind power generators grouped into wind farms, may be referred to as "wind farm controllers," a term used in U.S. Pat. No. 7,166,928 ("Larsen") and in US Published Application US 2010/0025994 ("Cardinal et al."), which are incorporated herein by reference. Larsen teaches that a relatively fast voltage regulator at an individual turbine generator is adjusted by a relatively slow wind-farm level reactive power regulator, which is an example of what is referred to herein as a "master reactive controller." The voltage regulators of Larsen have no reactive control capability, and are, thus, not reactive controllers, as the term is used herein. Cardinal et al. teach wind farm controllers and an "intra-area master reactive controller." The wind farm controller and the intra-area master reactive controller are all "master reactive controllers" in the sense in which the term is used herein.

Reactive controllers used today may be referred to as "standard reactive controllers." Reactive power control is described, for example, in published US Patent Application 2003/0173938, to Trainer, incorporated herein by reference. An example of a standard reactive controller is a reactive power management system (RPMS) used in the context of a wind farm. All such standard reactive controllers are master reactive controllers. An example of a reactive controller is a Dynamic Reactive Power Controller, available commercially from Advanced Energy Conversion, LLC of Schenectady, N.Y., for use with external capacitor stages. All standard reactive controllers suffer from limitations including response time and dynamic range, for example.

The foregoing limitations are particularly acute when wind generators are connected to the power grid, since wind generation is necessarily volatile, insofar as it cannot be scheduled on demand. It quickly became apparent to the grid operators that there was an adverse effect from reactive power (measured, typically, in megavolt amps reactance, or MVAR) absorbed from the grid by early wind generators with inductive generators. Power factor correcting capacitors had to be installed at or near the point of grid interconnection (POI) of each wind generator, and, in some cases, utilities installed capacitors to make the correction.

Supplying the required amount of MVAR with capacitors from the generation side of an interconnection substation transformer, however, cannot be achieved without causing an unacceptable voltage rise to the generator side. Moreover, the control of both steady state and dynamic response of capacitive MVAR cannot be achieved satisfactorily with traditional control techniques, creating an urgent need for a remedy.

In addition, certain distributed generators in current use can vary their reactive power for independently controlling the voltage levels measured at the AC mains of each individual distributed generator. A result of the operation of prior art systems is that each generator may be called upon to reduce reactive output to lower the voltage if the voltage exceeds the upper level of the nominal operating band, even if additional reactive output is desirable. Conversely, each generator may increase reactive output to increase the voltage if the voltage falls below the lower level of the nominal operating band. As used herein and in any appended claims, the terms "AC mains," or "local mains," as applied to a distributed generator, refers to the AC voltage measured at the transformer of each wind turbine generator.

Standard reactive controllers, such as reactive power management systems (RPMSs), may turn power generation sources (wind turbines, solar plants, etc.) on and off. Such systems, however, operate under well-known constraints. In particular, since an MVAR supply of the generator side of an interconnect substation transformer may cause an overvoltage condition, a remedy involving a load tap changer (LTC) on the interconnect transformer might be considered, however that solution is both costly and suffers from slow response time that can give rise to severe equipment damage.

General principles of electric power distribution may be found in Short, *Electric Power Distribution Handbook,*

(CRC Press, 2004) and in Ackermann,—*Wind Power in Power Systems* (Wiley, 2005), both of which books are incorporated herein by reference. The definitive treatises describing the state of the art in reactive controllers include Miller, *Reactive Power Control in Electrical Systems* (Wiley, 1982), and Blaabjerg et al., *Power Electronics for Modern Wind Turbines*, (Morgan & Claypool, 2006), both of which are incorporated herein by reference.

SUMMARY OF EMBODIMENTS OF THE INVENTION

In accordance with embodiments of the present invention, apparatus and methods are provided for changing a state of a power distribution system based at least on constraints of a master reactive controller in conjunction with other system conditions.

In certain embodiments, a reactive follower is provided that has a multifunction power meter coupled to a power network at a point of interconnection for producing a measurement including power (P), reactive power (Q), and voltage (V) signals. The reactive follower also has a reactive power generator coupled to a distributed generation plant via a series impedance, and a reactive follower controller for controlling the reactive power generator, where the reactive follower controller includes:

a reactive power estimator for estimating the reactive power commanded by a distributed generation reactive power management system; and
  a multi-variable control logic that determines when to increase reactive power produced by the reactive power generator based on the reactive power commanded by the distributed reactive power management system and the point-of-interconnection measurement.

In accordance with other embodiments of the invention, the series impedance may be a step-up transformer, and, more particularly, one that includes an under-load tap changer. The multifunction power meter may be coupled to the power network via at least one of a current transformer and a potential transformer.

In yet other embodiments of the present invention, the reactive follower may be coupled to a plurality of distributed real and reactive power generators in such a manner as to limit reactive power output of the plurality of reactive power generators to maintain local mains voltages of each of the plurality of distributed real and reactive power generators within a specified operating band. The reactive follower may also be adapted for dynamically adjusting a plurality of set points based on power generation levels.

In accordance with alternate embodiments of the invention, a system is provided for providing generated power to a power grid. The system has a distributed power plant electrically coupled to the power grid at a point of interconnection and a reactive follower coupled to the distributed power plant via a series impedance.

In further embodiments, the series impedance may be reactive, and it may be a step-up transformer.

In accordance with other aspects of the invention, a method is provided for regulating reactive power in a distributed power generation system. The method has steps of:

performing a point-of-interconnection measurement of power, reactive power and voltage at a point of interconnection to a power grid;
  estimating reactive power commanded by a distributed generation reactive power management system; and
  determining when to increase reactive power produced by a reactive power generator based on the reactive power commanded by the distributed reactive power management system and the point-of-interconnection measurement.

In alternate embodiments, switching may be performed on a plurality of axes of control.

BRIEF DESCRIPTION OF THE DRAWINGS

The foregoing features of the invention will be more readily understood by reference to the following detailed description, taken with reference to the accompanying drawings, in which.

DESCRIPTION OF SPECIFIC EMBODIMENTS OF THE INVENTION

Figure 1:
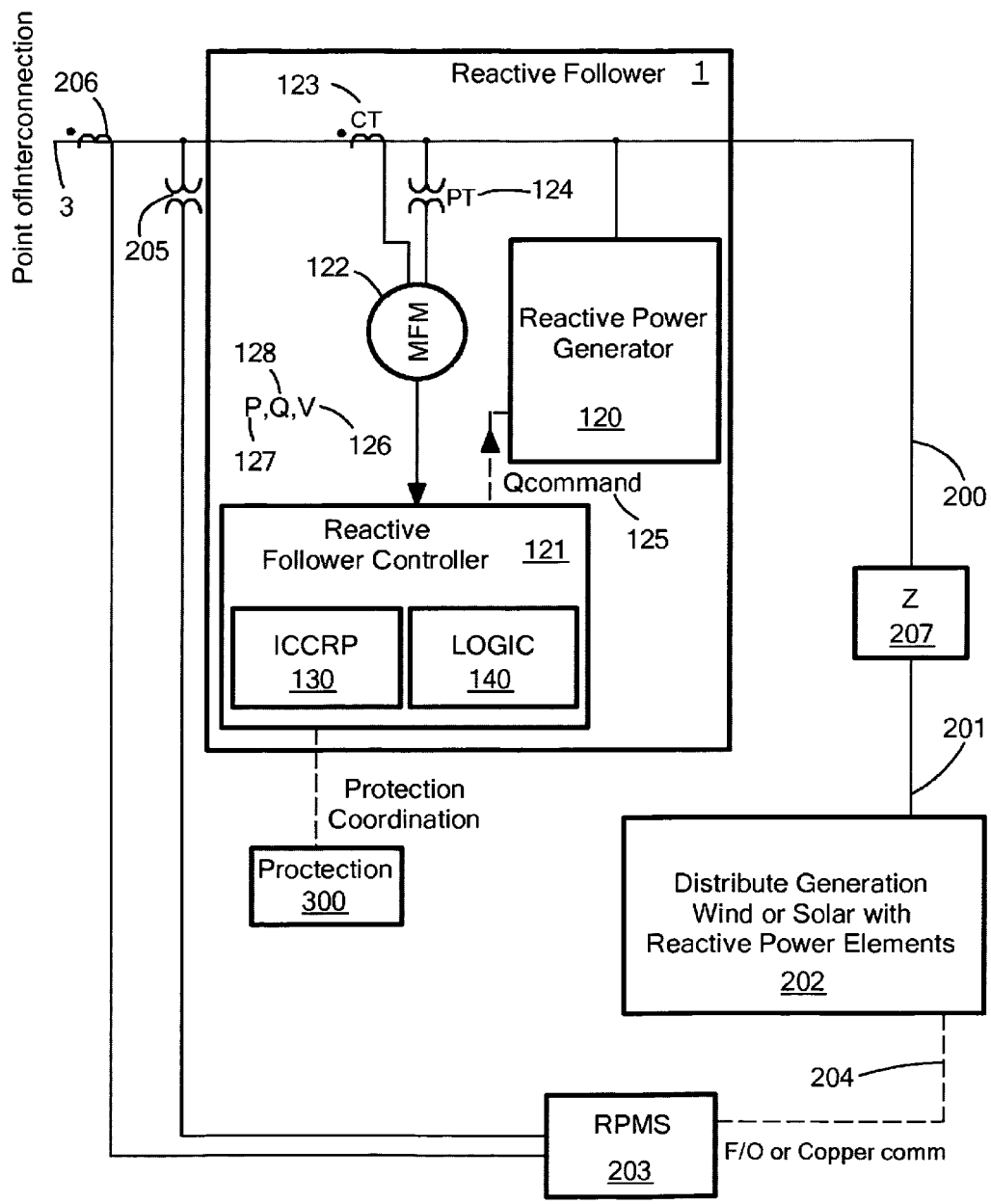
FIG. 1 shows a schematic depiction of overall operation of a reactive follower connected to a distributed generation plant in accordance with an embodiment of the present invention.

In order to ameliorate extreme demands on a master reactive controller within a power system, the present inventors have invented a novel concept which they have named a "reactivefollower," in analogy to "master/follower" configurations that are used in the context of automatic voltage, reactive, or power factor control at an aggregate point of electrical power delivered from a series of distributed real and reactive power generators on an AC power system. The term "follower," however, has never been used before in the context of switching reactances, typically capacitances, for the purpose of reactive power management.

Specific contexts where followers may be employed advantageously include the following, by way of example:

where there is lumped series impedance, such as an AC power transformer, between the aggregating point and distributed real and reactive generators;
  where, concurrently distant power transformers on the AC power system track tap-changing instructions issued at a master transformer in order to maintain constant voltage at the customer interface of varying loads;
  where there is a switched reactance between the lumped series impedance and the distributed real and reactive power generators;
  where there is a controller which follows power flow conditions at the location of the switched reactance and concurrently uses a "plant model" to determine when to switch in or out the reactance in order to follow either dependently or independently the mater reactive controller on the AC power system in order to extend its reactive power capability.

DEFINITIONS

As used herein, and in any appended claims, the term "GSU" shall refer to a Generator Step-Up transformer. The term "DG" shall refer to "Distributed Generation," while "DL" shall refer to "Distributed Load." "ULTCs," as used herein, denote an "under-load tap-changing" transformers. "POI" refers to "point of interconnection." P, Q, and V have their conventional meanings of real (or "active") power, reactive power, and voltage. Reactive power may be expressed in terms of Volt-Amperes and may be referred to herein as "var" or "var flow." The real power at a specified point of interconnection of a distributed generator to the grid may be referred to as a "power generation level."

The term "distributed generation plant," as used herein and in any appended claims, shall refer to a small electrical power generating facility, typically in the capacity range between 5 kW and 10 MW, connected to a larger electrical power grid. The operation of a distributed generation plant may be referred to as "distributed generation."

"Power factor rectangle requirements" refer to requirements (such as the Protocol Review Request PRR830) of utility regulatory bodies concerning reactive capability characteristics as reflected in reactive capability versus terminal voltage, described, in detail, in Ellis et al., *Reactive Power Interconnection Requirements for PV and Wind Plants— Recommendations to NERC*, Sandia National Lab Report SAND2012-1098, (2012), which is incorporated herein by reference in its entirety.

A "set point," as used herein and in any appended claims, refers to a neutral value of a parameter within a power system about which the parameter, which may be a voltage of a reactive power, for example, is subject to servo control by a closed loop of a control system.

A reactive follower, which is the device that has been invented by the present inventors, is any device which senses any combination of power, reactive power, and voltage at a particular node in an electrical power system, and, at the same time, takes into account the constraints of a master reactive controller that is also coupled to the system, and changes reactive state based on the local measurements and the known constraints of the master reactive controller.

"Reactive following," as the term shall be used herein, shall refer to sensing any combination of power, reactive power, and voltage at a particular node in a system, and, at the same time, accounting for constraints of a master reactive controller that is also coupled to the system, and changing reactive state based on the local measurements and the known constraints of the master reactive controller.

Various embodiments of the present invention, as described in detail below, may advantageously achieve one or more of the following objectives, although any particular embodiment need not achieve a specified objective to be encompassed within the scope of the present invention as claimed:

distributed generation and loads of other reactive controllers and other reactive elements on AC polyphase power systems;

provision of reactive following for distributed generation and loads of other reactive controllers that enhances or extends the operating range of distributed generation systems with integrated dynamic reactive capability;

provision of reactive following for distributed generation and loads of other reactive controllers that meets extensive grid interconnection requirements which involve both industry standards as well as requirements unique to specific generation grid requirements;

provision of reactive following for distributed generation and loads of other reactive controllers that resolves volatile reactive requirements which occur when power produced by either wind or solar cannot be scheduled due to the variability of weather conditions;

provision of reactive following for distributed generation and loads of other reactive controllers that integrates with existing reactive controllers without altering pre-existing reactive controllers and equipment in place on the AC polyphase power system;

provision of reactive following for distributed generation and loads of other reactive controllers that relive the wind or solar plant of the added voltage stresses they experience when supplying reactive power to interconnection requirements;

operation in conjunction with distributed real and reactive power generators on an AC power system which limit the reactive output of the distributed generators at their local mains in order to maintain operating with their nominal operating local mains voltage while maximizing their reactive output;

a reactive follower, which takes into account real power generation levels, reactive power generation levels, and voltage levels and indirectly adjusts the set points dynamically by a compensation algorithm;

a reactive follower controller which assists distributed generation facilities to meet the power factor rectangle requirements (defined above) for the interconnecting utility;

a reactive follower, which reacts dynamically to changing system voltage and var flow. The dynamic var flow of a turbine controller may be inferred by a separate controller that has been programmed with settings from a model and manufacturer data detailing the turbine capabilities. Based on current transformer (CT) and potential transformer (PT) inputs, the inferred value of var flow tells the controller where the turbines are operating and allows it to make intelligent decisions in applying the reactive resources at its command.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

The general configuration of an embodiment of a reactive follower 1 is now described in detail with reference to FIG. 1. Reactive follower 1 may also be referred to, herein, as a "reactive power follower."

A distributed generation plant 202 (referred to, herein, as a "plant") may be a solar or wind plant, for example, with the capacity to produce real and reactive power at the point of interconnection (POI) 3 where the distributed generation plant is connected to a power grid (not shown). The plant 202 may have a generator with integrated reactive power control capability. Also the distributed generation plant may be able to send the real and reactive power up to a point of interconnection. The plant 202 has a reactive power management system 203 that controls the reactive power from the plant.

By way of example, the distributed generation plant 202 may be a wind plant with many discrete wind turbine generators scattered throughout the wind plant, or it may be a solar plant with many discrete inverters scatter though the collector system of the solar plant.

Reactive Follower 1 includes a current transformer (CT) 123 and a potential transformer (PT) 124, both electrically connected to a multifunction power meter 122 which measures power, reactive power, and voltage, producing signals P, Q and V, respectively, and sends them to the reactive follower controller 121, and, more particularly, to reactive follower control logic 140.

The reactive follower control logic 140 includes a reactive power estimator 141 that estimates the reactive power commanded by a distributed generation reactive power management system 203 and a multi variable control logic 142 that determines when to increase the reactive power produced by a reactive power generator 120. The reactive power follower 1 also has the capability to coordinate its function with existing relay control logic (not shown), which may be part of the distributed generation plant 202.

Reactive follower 1 measures the voltage real power and reactive power produce by the wind plant and uses a plant model to estimate the reactive power commanded by the reactive power management system 203 of the distributed generation plant 202. Depending on the commanded reactive power, the reactive follower 1 switches in reactive power when the wind plant cannot meet its reactive power requirements due to some constraint within the plant 202.

Reactive follower 1 may, or may not, be directly connected to the reactive power management system 203 of the distributed generation plant 202. The reactive follower 1 may use capacitor or reactor banks (not shown) to switch in or out to relieve the distributed generation plant 202 of its reactive power requirements. the reactive follower may use a variable reactive power generator 120 to introduce, or to take out, reactive power, thereby relieving the distributed generation plant 202 of its reactive power requirements, or, otherwise, extending its capacity.

Connections of Main Elements and Sub-Elements of a Certain Embodiments of the Invention The main elements of certain embodiments of the present invention include both the distributed generation plant 202 and the reactive follower 1. The sub elements in the reactive follower 1, coupled mechanically, electrically, or logically, include the reactive follower controller 121 and reactive power generator 120. The CT 123 and PT 124 are connected to the reactive follower controller 121. The reactive follower controller 121 may be implemented using a programmable logic controller. the reactive follower controller 121 uses logic 140 and algorithms, such as an inferred cumulative reactive power algorithm 130, to compute when the reactive power generator 120 should be switched in or contribute to changing the reactive power. The reactive power controller 121 is connected to the reactive power generator 120 through an electrical connection that may be a data link of a discrete signal that commands a capacitor or reactive bank to close in, thereby providing added reactive power to the AC system via POI 3.

In preferred embodiments of the present invention, reactive follower 1 monitors the real and reactive power produced by the distributed generation plant 202. Additionally, the reactive follower 1 may monitor the voltage. The reactive follower 1 then puts these values in to an estimation algorithm that estimates the reactive power commanded by the distributed generation plant reactive power management system. Methods for estimating the reactive power commanded by the distributed generation plant are described, below, with reference to FIG. 2. The reactive follower—1 then uses switching logic, described below with reference to FIG. 3, to determine when a reactive power generator 120 is to add, or to take away, reactive power, relative to the distributed generation plant 202.

Reactive follower 1 has a reactive power generator 120 place on the transmission side 200 (otherwise referred to as a "high" side) of a series impedance 207 between the reactive power generator 120 and the collection system (or "collector system") 201 of the distributed generation plant 202. Series impedance 207 may reactive, and may be a step-up transformer, for example, with or without an underload tap changer.

Reactive Follower 1 takes advantage of the series impedance 207 to enhance the reactive capabilities of distributed generation plant 202. This is because the reactive power generator 120 is placed ahead of the series impedance 207 and this reactive power is not constrained by said series impedance. Consequently, when the reactive follower 1 adds reactive power to the system, there is less stress on the overall power system and the distributed generation plant 202 is able to generate greater magnitudes of reactive power as well as increase the swing of reactive power.

Figure 2:
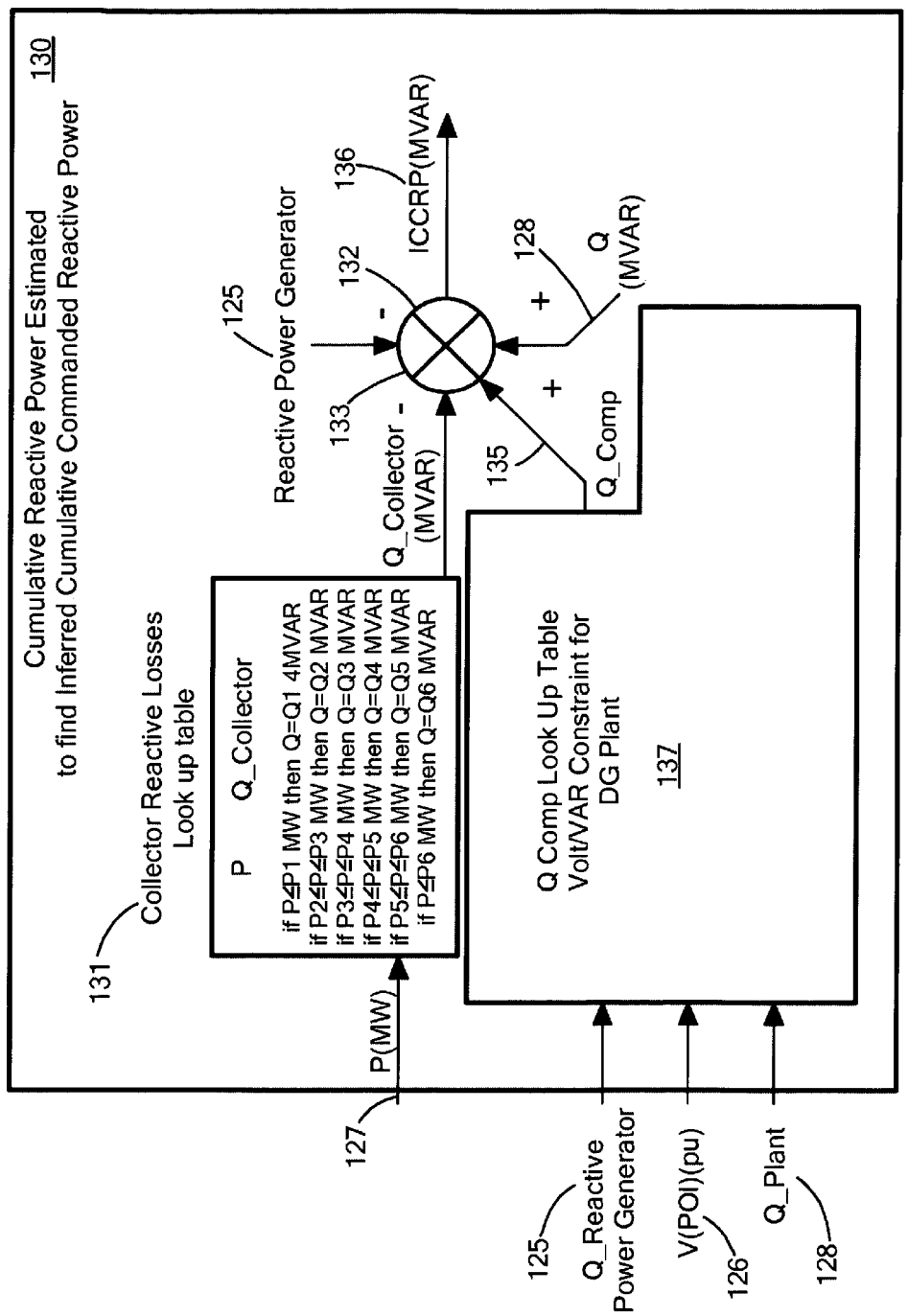
FIG. 2 depicts overall operation of an embodiment of the present invention in which a cumulative commanded reactive power estimator is employed in the context of a reactive follower in accordance with an embodiment of the present invention.

Operation of the inferred cumulative reactive power algorithm 130 is now described with reference to FIG. 2. A commanded reactive power 125, a voltage 126 measured at the POI, and measured reactive power 128 are input to a collector compensation algorithm 137, which may be implemented as a look-up table to generate an estimated compensation (Q_Comp) 135 for a voltage variation constraint. A signal Q_Collector is derived from a measurement of power 127 by a look-up table 131 reflecting collector reactive losses. Q_Comp is combined with the additive inverse of Q_Collector and the additive inverse of the reactive power 125 of the reactive power generator 120 and with the reactive power (Q_Plant) 128 of the distributed generation plant 202 to produce an Inferred Cumulative Commanded Reactive Power (ICCRP) 136.

In accordance with alternate embodiments of the invention, the Reactive Follower Controller may additionally switch on multiple and simultaneous axes of control, such as distinct phases of power measured at the POI.

Figure 3:
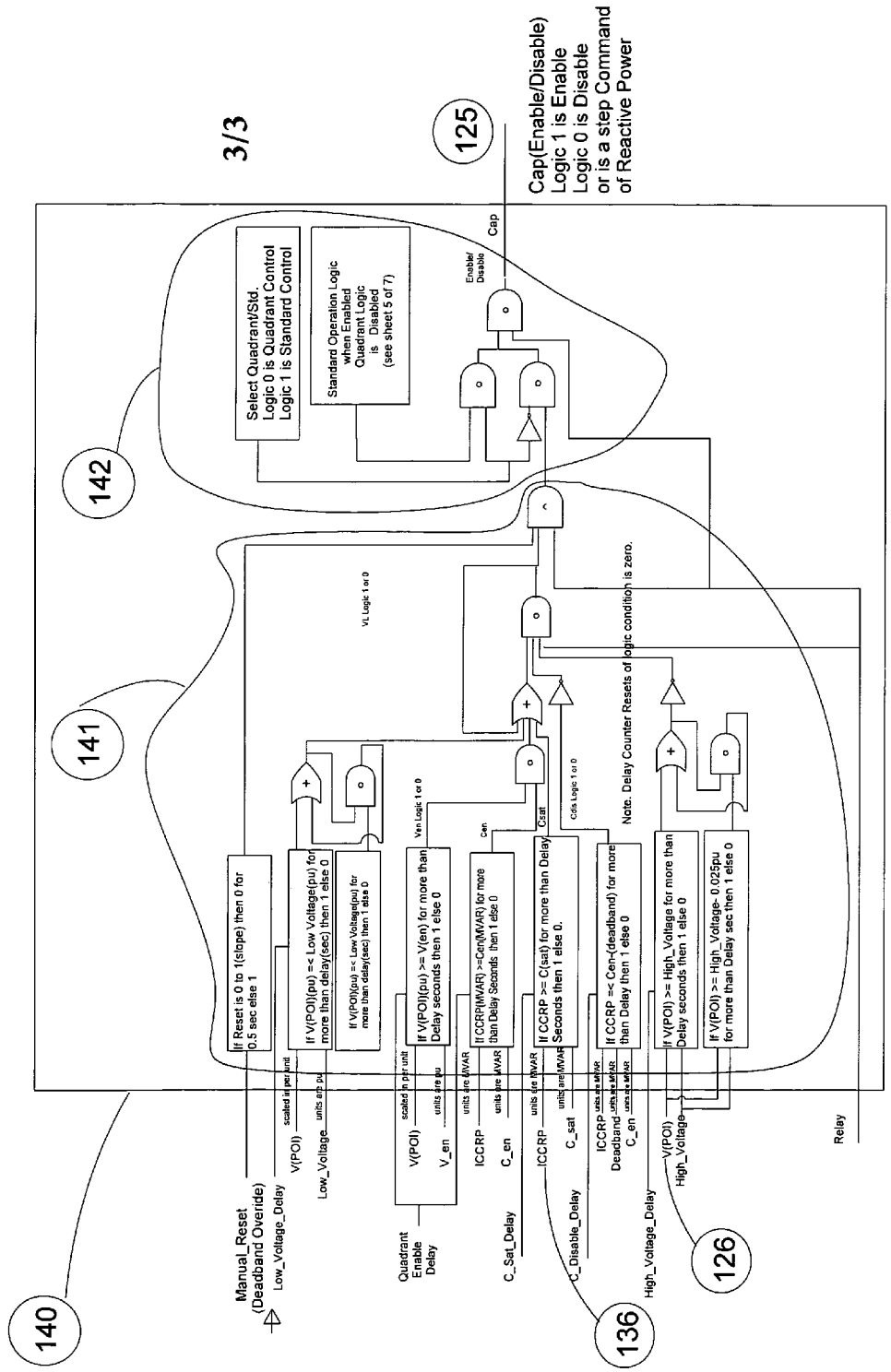
FIG. 3 depicts overall operation of switching logic in the context of a reactive follower in accordance with an embodiment of the present invention.

Operation of Switching Logic 140 is depicted in FIG. 3.

Alternative Embodiments of Invention

In accordance with alternative embodiments of the present invention, reactive power management system 203 may be connected to the reactive follower controller 121 via a data link from the reactive power management system to the reactive follower controller. Additionally, a protective relay signal may be sent by Protection circuit 300 to reactive follower controller 121 to disable the reactive power generator 120 when a disturbance occurs on the power system.

A reactive follower in accordance with alternate embodiments of the present invention, may use the methods and algorithms that have been described in detail above for purposes of dynamically adjusting one or more power system set points based on current power generation levels.

In certain embodiments of the present invention, the disclosed methods for reactive following may be implemented in part as a computer program product for use with a computer system. Such implementations may include a series of computer instructions fixed either on a tangible and non-transitory medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

What has been described and illustrated herein includes a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and are intended to have no legal or limiting effect.

What is claimed is:

1. A reactive follower for a polyphase AC power system that is connected to a power grid,
   wherein the reactive follower is connected to the transmission side of the polyphase AC power system;
   the polyphase AC power system comprising:
   a distributed generation power plant (202) comprising a plurality of real and reactive power generators,
   a reactive power management system (203) for managing reactive power produced by the distributed generation power plant (202), and
   a series impedance (207) connecting the distributed generation power plant (202) to the power grid at a point of interconnection;
   the reactive follower comprising:
   a) a multifunction power meter (122) coupled to a sensing current transformer (123) and a sensing voltage transformer (124) between the point of interconnection to the power grid and the series impedance, wherein the multifunction power meter (122) measures power (P) (127), reactive power (Q)(128) and voltage (V)(126) based on signals from the current transformer (123) and the voltage transformer (124);
   b) a reactive power generator (120) coupled to the distributed generation power plant's polyphase AC power system between the point of interconnection (3) and the series impedance, the reactive power generator 120 to introduce, or to take out, reactive power by switching one or more of at least one of a capacitor or a reactive element; and
   c) a reactive follower controller (121) coupled to the reactive power generator (120) for controlling the reactive power generator (120) based on a model of the distributed generation power plant (202) that comprises:
   i) a reactive power estimator (136) for estimating the cumulative reactive power commanded by the reactive power management system (203), iii) a first look up table (131) programmed in a programmed product for use with a computer system that outputs reactive power as a function of the measured power (P)(127) and reactive losses of the collector system of the distributed generation power plant (202),
   iv) a collector compensation algorithm (137) programmed in a programmed product for use with a computer system that outputs reactive compensation needed due to at least one constraint (135) of the reactive power management system (203), as a function of the reactive power (125) produced by the reactive power generator (120), the voltage measured at the point of interconnection (126), and the reactive power (Q)(128) produced by the distributed generation power plant (202),
   v) multi-variable control logic (140) programmed in a programmed product for use with a computer system for controlling the reactive power generator (120) based on output from the first look-up table (131) and the collector compensation algorithm (137);
   wherein the reactive follower and the reactive power management system (203) operate to control reactive power independently of each other and
   the reactive follower expands the capability of the distributed generation power plant (202) to produce real and reactive power.

2. A reactive follower in accordance with claim 1, wherein the distributed generation power plant (202) comprises a wind power plant and the operating range of the distributed generation power plant's (202) reactive power capability is extended beyond a voltage constraint, wherein the voltage constraint relieved is caused by a step-up transformer.

3. A reactive follower in accordance with claim 2, wherein the step-up transformer operates with an under-load tap changer.

4. A reactive follower in accordance with claim 1, adapted to relieve the constrained output of real and reactive power of the plurality of real and reactive power generators and maintains local mains voltages of each said plurality of real and reactive power generators within a specified operating band.

5. A reactive follower in accordance with claim 1, adapted to dynamically adjust a plurality of set points within the distributed generation power plant (202).

6. A reactive follower in accordance with claim 1, wherein the collector compensation algorithm (137) is implemented as a look-up table.

7. A reactive follower in accordance with claim 1, wherein the distributed generation power plant (202) comprises a wind power plant and the estimated cumulative reactive power commanded by the reactive power management system (203) is determined at least in part based on settings from model and manufacturer data detailing turbine capabilities.

8. A system for providing generated power to a power grid comprising a reactive follower integrated with a polyphase AC power system that is connected to a power grid,
   wherein the reactive follower is connected to the transmission side of the polyphase AC power system;
   the polyphase AC power system comprising:
   a distributed generation power plant (202) comprising a plurality of real and reactive power generators,
   a reactive power management system (203) for managing reactive power produced by the distributed generation power plant (202), and
   a series impedance (207) connecting the distributed generation power plant (202) to the power grid at a point of interconnection;

the reactive follower comprising:
a) a multifunction power meter (122) coupled to a sensing current transformer (123) and a sensing voltage transformer (124) between the point of interconnection to the power grid and the series impedance, wherein the multifunction power meter (122) measures power (P) (127), reactive power (Q)(128) and voltage (V)(126) based on signals from the current transformer (123) and the voltage transformer (124);
b) a reactive power generator (120) coupled to the distributed generation power plant's polyphase AC power system between the point of interconnection (3) and the series impedance, the reactive power generator 120 to introduce, or to take out, reactive power by switching one or more of at least one of a capacitor or a reactive element; and
c) a reactive follower controller (121) coupled to the reactive power generator (120) for controlling the reactive power generator (120) based on a model of the distributed generation power plant (202) that comprises:
i) a reactive power estimator (136) for estimating the cumulative reactive power commanded by the reactive power management system (203),
iii) a first look up table (131) programmed in a programmed product for use with a computer system that outputs reactive power as a function of the measured power (P)(127) and reactive losses of the collector system of the distributed generation power plant (202),
iv) a collector compensation algorithm (137) programmed in a programmed product for use with a computer system that outputs reactive compensation needed due to at least one constraint (135) of the reactive power management system (203), as a function of the reactive power (125) produced by the reactive power generator (120), the voltage measured at the point of interconnection (126), and the reactive power (Q)(128) produced by the distributed generation power plant (202),
v) multi-variable control logic (140) programmed in a programmed product for use with a computer system for controlling the reactive power generator (120) based on output from the first look-up table (131) and the collector compensation algorithm (137);
wherein the reactive follower and the reactive power management system (203) operate to control reactive power independently of each other and
the reactive follower expands the capability of the distributed generation power plant (202) to produce real and reactive power.

9. A system in accordance with claim 8, adapted to maintain local mains voltages of each said plurality of real and reactive power generators within a specified operating band, and wherein the collector system of the distributed generation power plant (202) and the series impedance are reactive.

10. A method for using a reactive follower to increase the reactive power capability of a polyphase AC power system connected to a power grid while relieving voltage stresses in the polyphase AC power system,
wherein the reactive follower is connected to the transmission side of the polyphase AC power system, and
wherein the polyphase AC power system comprises:
a distributed generation power plant (202) comprising a plurality of real and reactive power generators,
a reactive power management system (203) for managing reactive power produced by the distributed generation power plant (202), and
a series impedance (207) connecting the distributed generation power plant (202) to the power grid at a point of interconnection; and
the reactive follower comprises:
a) a multifunction power meter (122) coupled to a sensing current transformer (123) and a sensing voltage transformer (124) between the point of interconnection to the power grid and the series impedance, wherein the multifunction power meter (122) measures power (P) (127), reactive power (Q)(128) and voltage (V)(126) based on signals from the current transformer (123) and the voltage transformer (124);
b) a reactive power generator (120) coupled to the distributed generation power plant's polyphase AC power system between the point of interconnection (3) and the series impedance, the reactive power generator 120 to introduce, or to take out, reactive power by switching one or more of at least one of a capacitor or a reactive element; and
c) a reactive follower controller (121) coupled to the reactive power generator (120) for controlling the reactive power generator (120) based on a model of the distributed generation power plant (202) that comprises:
i) a reactive power estimator (136) for estimating the cumulative reactive power commanded by the reactive power management system (203),
iii) a first look up table (131) programmed in a programmed product for use with a computer system that outputs reactive power as a function of the measured power (P)(127) and reactive losses of the collector system of the distributed generation power plant (202),
iv) a collector compensation algorithm (137) programmed in a programmed product for use with a computer system that outputs reactive compensation needed due to at least one constraint (135) of the reactive power management system (203), as a function of the reactive power (125) produced by the reactive power generator (120), the voltage measured at the point of interconnection (126), and the reactive power (Q)(128) produced by the distributed generation power plant (202),
v) multi-variable control logic (140) programmed in a programmed product for use with a computer system for controlling the reactive power generator (120) based on output from the first look-up table (131) and the collector compensation algorithm (137);
wherein the reactive follower and the reactive power management system (203) operate to control reactive power independently of each other and
the reactive follower expands the capability of the distributed generation plant (202) to produce real and reactive power;
the method comprising:
a) measuring power (P)(127), reactive power (Q)(128) and voltage (V)(126) at the point of interconnection with the multifunction power meter (122),
b) estimating an inferred reactive power commanded by the reactive power management system (203),
c) changing the reactive power produced by the reactive power generator (120) based on the estimated inferred reactive power commanded by the reactive power management system (203) and the measuring power (P)(127), reactive power (Q)(128) and voltage (V)(126) at the point of interconnection.

11. A method in accordance with claim 10, wherein the reactive follower controller (121) switches on multiple and simultaneous axes of control.

\* \* \* \* \*